United States Patent [19]

Gyi

[11] 4,352,132
[45] Sep. 28, 1982

[54] FLOPPY DISC DRIVE
[75] Inventor: Koko Gyi, Thousand Oaks, Calif.
[73] Assignee: Data Master, Carmarillo, Calif.
[21] Appl. No.: 170,100
[22] Filed: Jul. 18, 1980
[51] Int. Cl.³ .................. G11B 5/016; G11B 3/62
[52] U.S. Cl. ................................ 360/97; 360/133
[58] Field of Search .................. 360/97–99, 360/133, 135, 137; 369/261, 270, 271

[56] References Cited

U.S. PATENT DOCUMENTS

| | | | |
|---|---|---|---|
| 3,670,315 | 6/1972 | Fowler | 360/97 |
| 4,060,839 | 11/1977 | Meadows | 360/99 |
| 4,149,207 | 4/1979 | Porter et al. | 360/133 |

Primary Examiner—John H. Wolff
Attorney, Agent, or Firm—Keith D. Beecher

[57] ABSTRACT

A floppy disc drive which is constructed so that when a record disc is inserted into the unit, the disc actuates a microswitch to energize an electric motor. The energized electric motor causes a central hub abruptly to start, and this action causes a coaxially mounted inertial disc to shift angularly with respect to the hub to release an eccentric spring-loaded centering pin. The released centering pin extends through the central hole of the record disc adjacent to the rim of the hole, and as the hub makes its first turn, the pin rides around the rim and serves to center the disc precisely with respect to the axis of rotation of the hub. After the hub has made a single turn, and the record disc has been centered, a solenoid is automatically energized which clamps the disc against the hub and which also resets the centering pin. The hub then continues to rotate and it turns the record disc about the axis of rotation of the hub, and data is written on or read from the record disc by an appropriate read/write magnetic head. The head is moved radially in steps as the disc turns, so that it is caused to follow a concentric path across the face of the disc. A second solenoid is energized to cause the disc to be pressed against the active face of the magnetic head. At the end of the operation, the second solenoid is de-energized to release the disc from the head, and the first solenoid is de-energized to cause the record to be automatically ejected from the unit.

7 Claims, 10 Drawing Figures

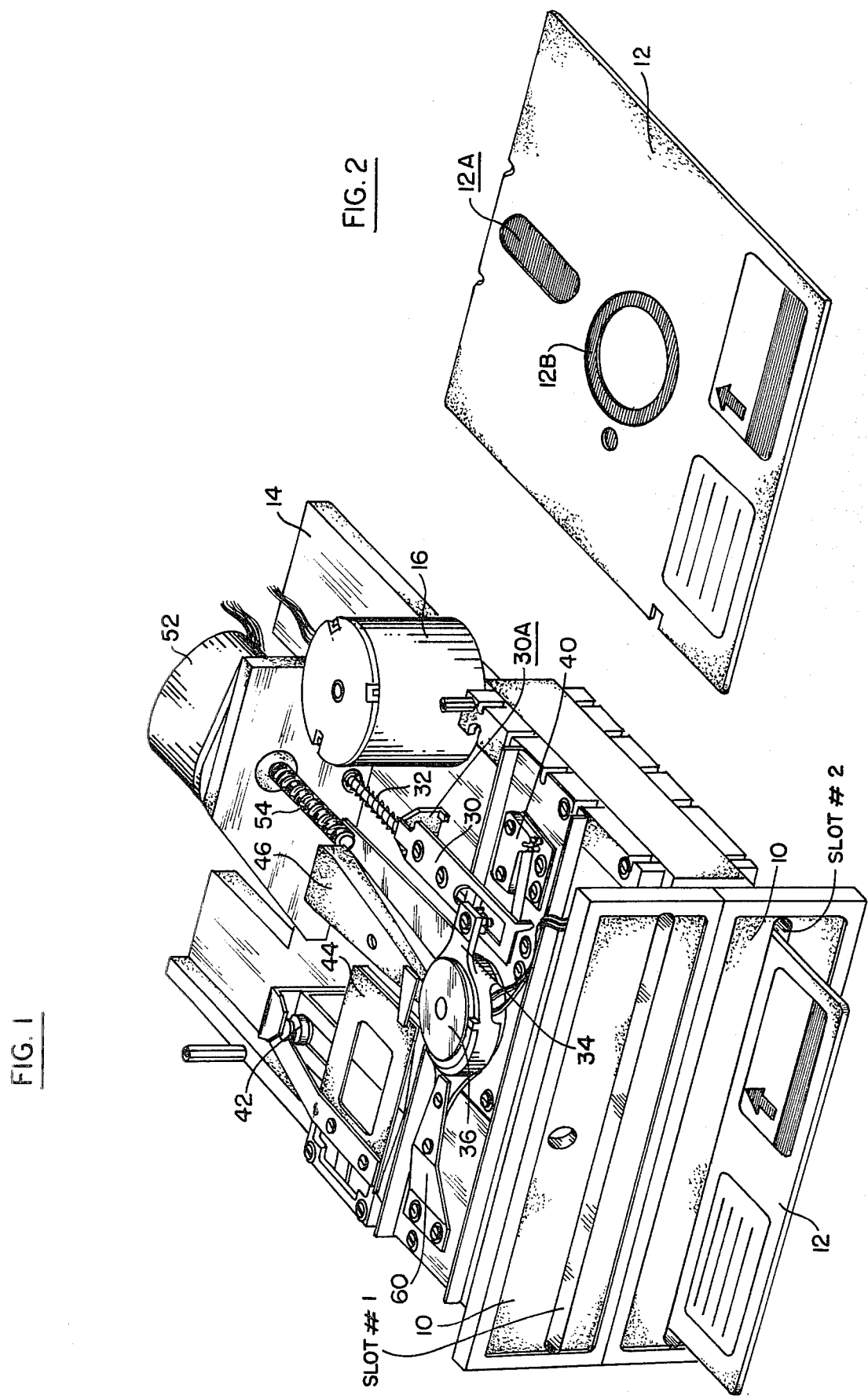

FLOPPY DISC DRIVE

BACKGROUND

Data storage units are known in which data is stored on flexible magnetic discs, known as "floppy discs", and subsequently read from the discs. In the prior art drive units, the discs are inserted into the unit through a slot. The slot is then closed by a manually operated cover. The cover is coupled to a disc-shaped clamp which serves to clamp the floppy disc to a drive hub. The hub is rotatably driven to turn the disc. A read/write magnetic head is moved radially with respect to the turning disc, so that data may be written on tracks across the face of the disc, and also so that previously written data may be read from the disc.

The drive mechanism of the present invention is an improvement over the prior art floppy disc drive described above, in that the disc is automatically centered and clamped against the drive hub after the disc has been inserted into the slot, and without any need to close a cover or to perform any other manual operations.

An important feature of the floppy disc drive of the present invention is that it includes means for positively assuring that the inserted floppy disc will be properly centered about the axis of rotation of the drive hub, before it is clamped against the hub.

The particular embodiment of the invention to be described is also advantageous over the prior art floppy disc drives since it contains a dual drive mechanism which enables two discs to be driven at the same time, so that identical or different information can be simultaneously read from or written on the two discs. There are drive units in the prior art which have two heads which engage the opposite sides of a single disc which has information to be written on or read from both sides. However, such prior art apparatus has been found to produce excessive wear on the discs. The dual disc unit of the present invention is one in which only one side of each of two discs is scanned at any one time by the magnetic head, so that the problem of wear does not arise.

BRIEF DESCRIPTION OF THE DRAWINGS

FIG. 1 is a perspective view of a floppy disc drive constructed in accordance with one embodiment of the present invention, and with the housing removed so as to reveal the internal operating components of the unit;

FIG. 2 is a perspective view of a typical floppy disc which may be inserted into the drive of FIG. 1, the drive being capable of receiving two such discs simultaneously, as will be described;

DETAILED DESCRIPTION OF THE ILLUSTRATED EMBODIMENT

The floppy disc drive of FIG. 1 is a dual unit, and it includes a slot designated "slot #1", and a second slot designated "slot #2" in its front face 10. These slots receive floppy discs 12, such as shown in FIG. 2. The floppy disc records are in the form of magnetic discs which are contained in a protective envelope, and when inserted into the floppy disc drive, the discs are rotated by a hub while still in their envelope, with a magnetic head engaging the disc through a slot in the envelope.

Figure 4:
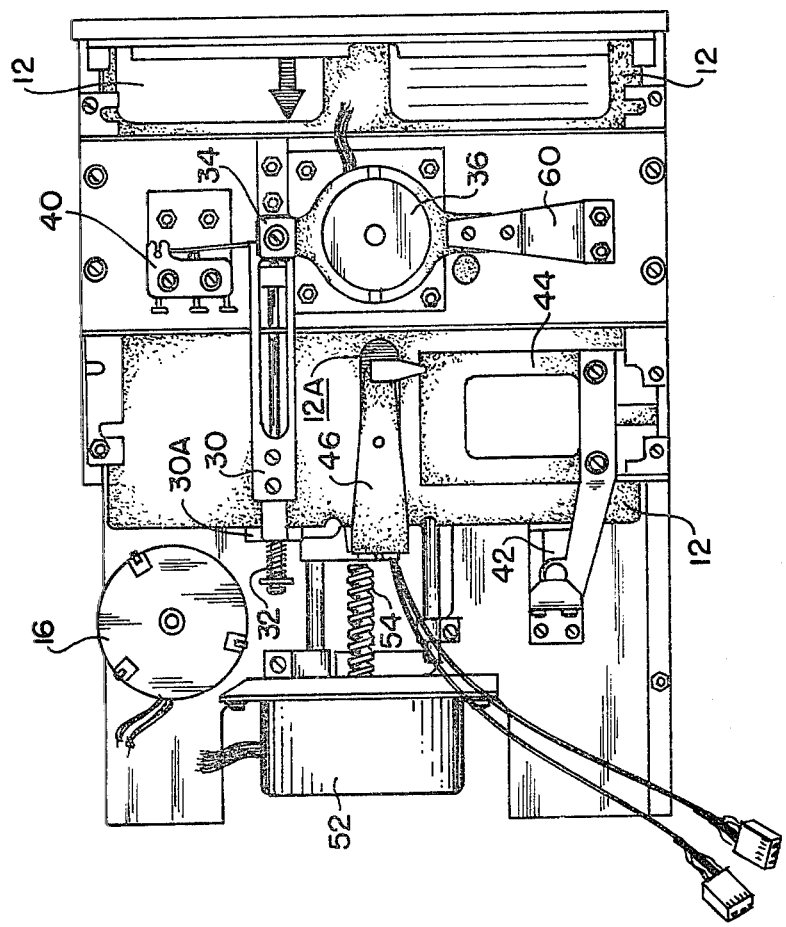
FIG. 4 is a view like FIG. 3, but with the operating components in position after a disc record has been inserted into the unit.
Figure 3:
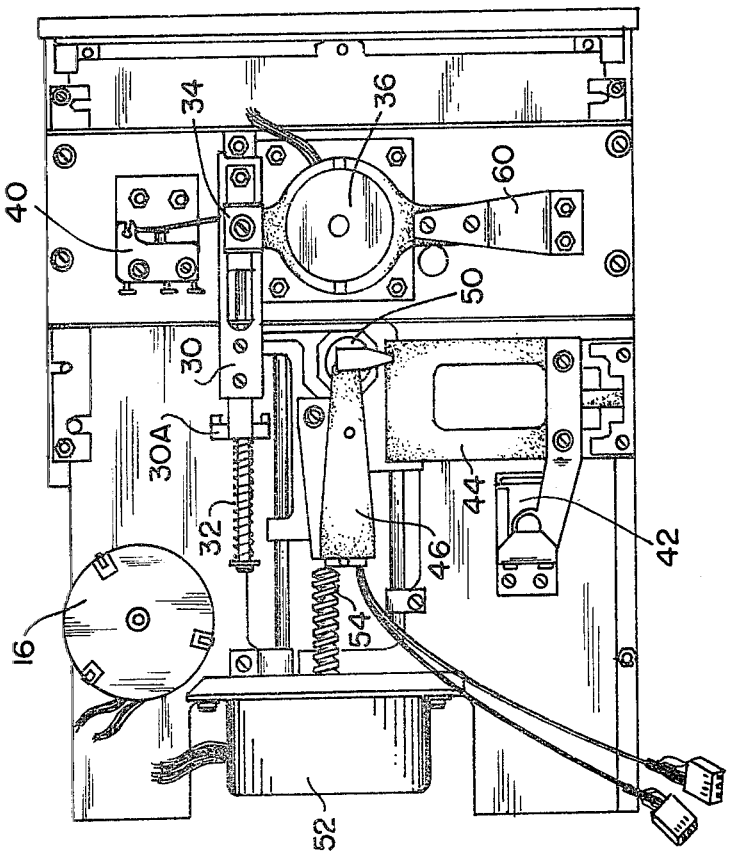
FIG. 3 is a top plan view of the drive of FIG. 1, with the operating components in position prior to the insertion of a disc record.

The dual unit shown in FIG. 1 is capable of driving two of the discs of FIG. 2 simultaneously, the discs being received in slots #1 and #2. When inserted into the unit, the same or different information may be written on both discs, or the same or different information may be read from both discs; or one disc may have information written on it while the other disc has information read from it. Duplicate elements are provided in the drive of FIG. 1 for the two discs. For convenience, the upper elements for driving the disc in the upper slot #1 are shown in FIGS. 1, 3 and 4; and the lower elements for driving the disc in the lower slot #2 are shown in FIG. 5.

Figure 5:
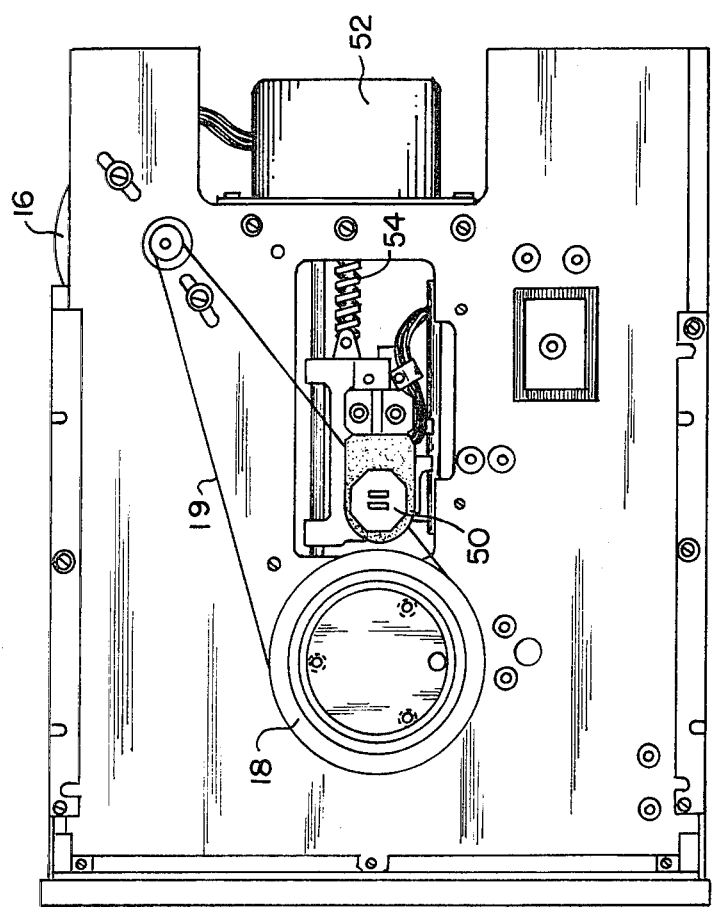
FIG. 5 is a bottom view of the unit of FIG. 1.

It will be appreciated that although the lower elements for driving the disc in the upper slot #1 are hidden, they are the same as the elements shown in FIG. 5. Likewise, it will be appreciated that while the upper elements for driving the disc in the lower slot #2 are hidden, they are the same as those shown in FIGS. 1, 3 and 4.

Figure 6:
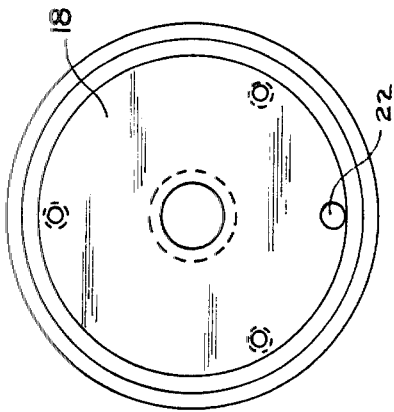
FIGS. 6 and 7 are respectively plan and side views of a drive hub which is included in the drive for rotatably driving the disc of FIG. 2 within its casing, about a particular axis of rotation.
Figure 7:
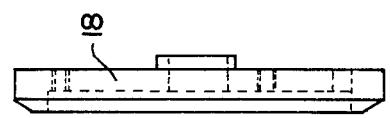

The floppy disc drive shown in FIG. 1, for example, includes a chassis 14 which extends inwardly from the front face 10, and which supports the various elements of the drive unit. A drive motor 16 is mounted on the chassis, and it drives a hub, such as hub 18 of FIG. 5 through a belt drive 19. The hub 18 has the configuration shown in FIGS. 6 and 7. An inertial disc 20, having the configuration shown in FIGS. 8 and 9 is coaxially mounted with the hub 18 for rotation with the hub about an axis of rotation designated X—X in FIG. 10.

Figure 10:
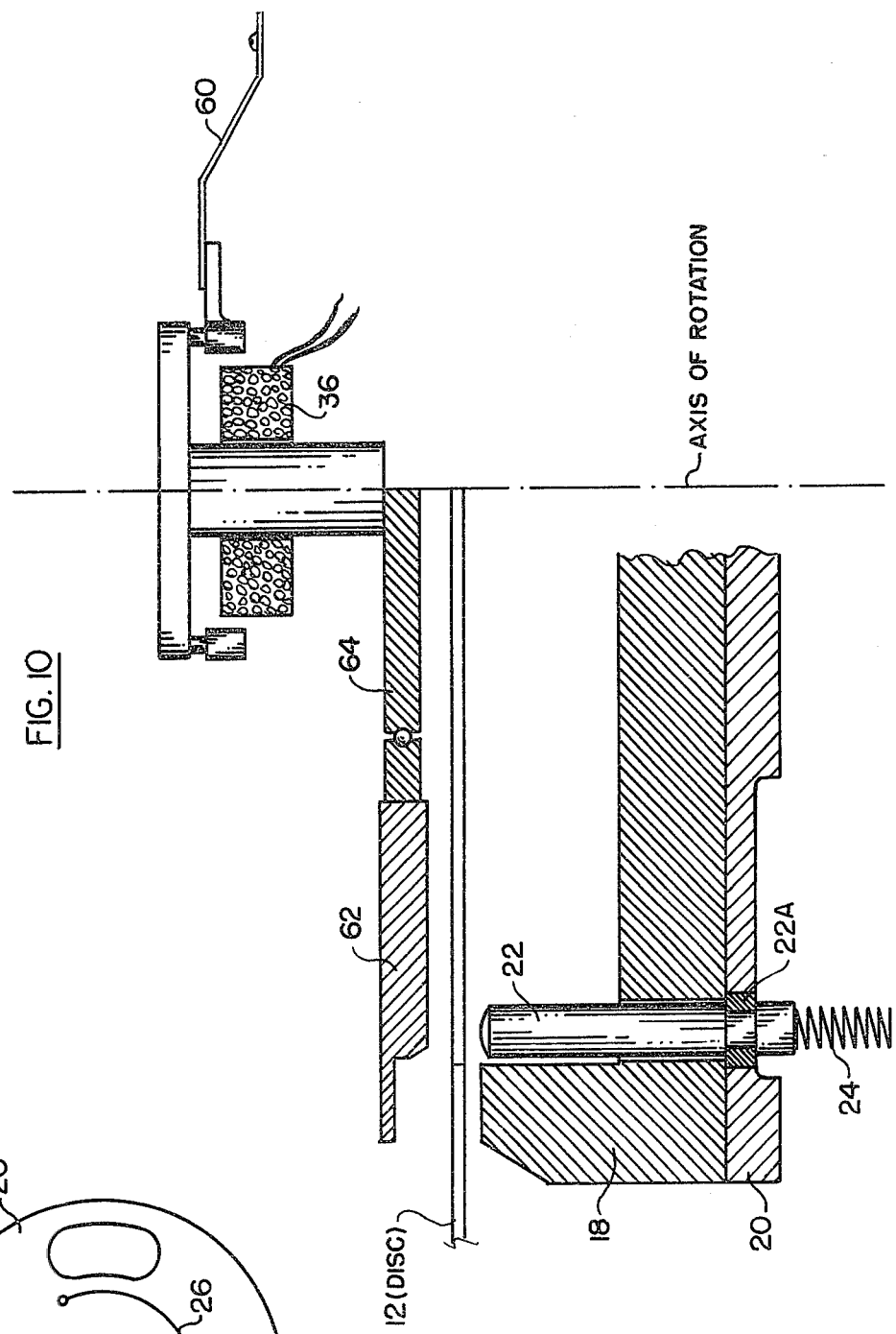
FIG. 10 is a sectional view showing a portion of the hub and inertial disc, and the position of a centering pin which is carried by the two elements.

An eccentric centering pin 22 (FIG. 6) is supported by the hub and inertial disc in the manner shown in FIG. 10, with the pin being spring-biased outwardly from the forward face of the hub by a spring 24. Pin 22 is normally locked in the position shown in FIG. 10 by virtue of a slot 22A which engages the edge of an opening in the inertial disc, as best shown in FIG. 8.

Figure 8:
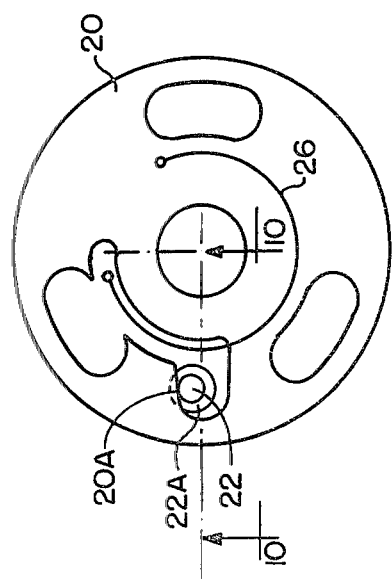
FIGS. 8 and 9 are plan and elevation views of an inertial disc which is coaxially mounted with the hub of FIGS. 6 and 7.
Figure 9:
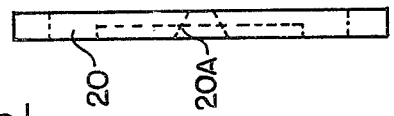

The inertial disc is spring-biased angularly with respect to the hub by means of a spring wire 26, as shown in FIG. 8, with one end of the wire being attached to the inertial disc, and the other end being attached to the hub. The spring normally biases the inertial disc in a counterclockwise direction, so that when the pin 22 is moved inwardly, its slot 22A will be engaged by a locking edge 20A of the inertial disc. However, when the hub 18 is abruptly turned from a stationary condition, the inertial disc 20 turns relative to the hub against the tension of spring 26, causing the locking edge 20A to move away from pin 22 so that the pin is moved outwardly from the hub by spring 24.

The drive of FIG. 1 also includes a spring-loaded ejecting arm 30 which is moved inwardly against the force of a spring 32 when a disc 12 is inserted into the upper slot #1, and the ejecting arm 30 initially latches against a latch located under the end of an arm 34. Arm 34 is coupled to a solenoid 36 by a leaf spring 60. The solenoid, when energized, causes a clamp 62 to move against the rim of the central hole of the disc 12 (FIG. 10). The rim of the central hole of the disc is thereby clamped against the hub 18, so that when the hub is turned, the disc will turn in its casing. The clamp 62 is mounted on a bearing 64 so that when the hub 18 turns, clamp 62 turns with it while clamping disc 12 on the hub 18. When the solenoid 36 is deenergized, spring 60 returns its armature and clamp 62 to the position shown in FIG. 10, in which disc 12 is released.

A microswitch 40 is also mounted on chassis 14 in the path of the disc 12. As the disc is inserted in the upper slot #1, microswitch 40 is actuated to initiate a disc centering cycle to be described.

The drive also includes a second solenoid 42 which, when energized, causes a hinged member 44 to move inwardly and release a second hinged member 46, so that the second hinged member may bear against the portion of the disc of FIG. 2 exposed through an opening 12A in the casing, to press the disc against the face of a read/write magnetic head 50, such as the head shown in FIG. 5. The head 50 is driven radially across the portion of the disc exposed through the opening 12A by a drive motor 52 which drives the head by means of a lead screw 54. Solenoid 36 is mounted on chassis 14, and when the solenoid is energized, it moves inwardly toward hub 18, and a freely rotatable annular member (not shown) on the solenoid presses the rim portion 12B of the record visible through the central hole of the casing in FIG. 2 against the hub, so that rotation of the hub causes the record disc to rotate within its envelope. The arm 34 which is mounted on leaf spring 60 is also moved inwards by the energized solenoid 36 so that a hook-shaped catch (not shown) on the end of the arm engages the ejecting arm 30.

FIG. 3 shows the various operating components of the drive of FIG. 1, when the drive is de-energized, and prior to the insertion of a disc 12. FIG. 4 shows the mechanism of FIG. 3 after a disc 12 has been inserted into the upper slot #1.

When the disc is inserted in the upper slot, it moves the ejector arm to the left against the force of spring 32, and causes the ejector arm to be latched on the catch (not shown) under the end of arm 34. The insertion of the disc also causes microswitch 40 to close, which energizes the drive motor 16. Drive motor 16 then abruptly turns the hub 18 from its position of rest, and this action causes the inertial disc 20 to release the centering pin 22. The centering pin then moves so that its end protrudes beyond the plane of the hub, and through the hole in the center of the disc 12.

The centering pin 22 is located adjacent to the rim of the hole, and when the hub turns through its first turn, the centering pin moves around the rim and centers the disc precisely with respect to the axis of rotation of the hub. When the hub has completed its first turn, solenoid 36 is energized and clamps the rim of the disc firmly against the hub, so that as the hub continues to turn, the disc is rotated about the axis of rotation. This action also presses the centering pin 22 back into its position of FIG. 10, at which it is locked by the inertial disc 20. The solenoid 42 is now energized, and it causes the member 46 to press the disc against head 50, so that information may be written on the disc, or read from the disc. As the disc rotates, the motor 52 drives the head radially with respect to the disc, so that the head is caused to follow a spiral path across the face of the disc.

At the end of the operation, motor 16 is automatically de-energized to stop the rotation of the disc, solenoid 42 is de-energized to release the disc from the magnetic head 50, motor 52 in placed in reverse to return the head to its original position, and solenoid 36 is de-energized to release the disc from the hub. When solenoid 36 is de-energized, the spring-loaded arm 30 moves from the position shown in FIG. 4 to the position shown in FIG. 3 and thereby ejects the disc through the upper slot #1.

The invention provides, therefore, an improved floppy disc drive, in which the record discs are inserted through a slot in the side wall of the drive, and are then automatically centered, driven, and subsequently ejected.

It will be appreciated that while a particular embodiment of the invention has been shown and described, modifications may be made. It is intended in the claims to cover all modifications which come within the true spirit and scope of the invention.

What is claimed is:

1. A disc drive unit for a record disc having a hole therein, comprising: a chassis; a hub rotatably mounted on the chassis for rotation about an axis of rotation; a drive motor coupled to the hub; an inertial disc mounted coaxially with said hub for relative angular movement with respect thereto and for rotation therewith about said axis of rotation; a spring-loaded pin extending axially through the inertial disc and through the hub in a position displaced radially from the axis of rotation of the hub and of the inertial disc, said pin being locked in a retracted position by said inertial disc and released to an extended position with respect to the surface of the hub upon relative angular movement of the hub and the inertial disc; an end wall having a slot for receiving the record disc; and a switch mounted on the chassis in the path of said record disc to be actuated by the record disc upon the insertion thereof into said slot, said switch serving to energize the drive motor to cause said hub to turn and said inertial disc to release said pin so that the pin extends through the hole in the record disc in a position displaced from the center of said hole and adjacent to the rim thereof and turns around the rim as said hub turns about said axis of rotation to center the record disc with respect to the axis of rotation.

2. The disc drive unit defined in claim 1, and which includes a first solenoid and a clamp assembly actuated thereby for clamping the rim of the hole of the record disc against the hub to enable the hub to drive the record disc about said axis of rotation.

3. The disc drive unit defined in claim 2, and which includes a spring-loaded ejecting arm mounted on the chassis in the path of said record disc, and which is moved to a cocked position when the record disc is inserted into the slot, said arm serving to eject the record disc through the slot when the first solenoid is de-energized.

4. The disc drive unit defined in claim 2, and which includes a magnetic read/write head mounted on said chassis in position to engage the record disc when the record disc is inserted into the slot; and drive means for moving the head radially with respect to the record disc as the record disc rotates about said axis of rotation to cause the head to follow a spiral path with respect to a surface of the disc.

5. The disc drive unit defined in claim 4, and which includes a jacket for the disc, and which further includes means including a second solenoid for causing the record disc socket to be pressed against the disc with a predetermined load when the second solenoid is energized.

6. The disc drive unit defined in claim 1, in which said end wall has a second slot therein, and in which said unit includes duplicate components associated with the second slot.

7. The disc drive unit defined in claim 2, in which said clamp assembly includes a clamp, and bearing means supporting said clamp for rotation about the axis of rotation of said hub.

* * * * *